United States Patent
Kamiyama

(10) Patent No.: US 6,747,922 B2
(45) Date of Patent: Jun. 8, 2004

(54) TRACK-JUMP CONTROLLING APPARATUS AND METHOD

(75) Inventor: Hideyo Kamiyama, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 163 days.

(21) Appl. No.: 09/938,110

(22) Filed: Aug. 23, 2001

(65) Prior Publication Data

US 2002/0024898 A1 Feb. 28, 2002

(30) Foreign Application Priority Data

Aug. 24, 2000 (JP) ................................. P2000-254159

(51) Int. Cl.[7] ................................................. G11B 7/00
(52) U.S. Cl. ............................... 369/44.28; 369/44.29; 369/53.28
(58) Field of Search ........................... 369/44.27, 44.28, 369/44.29, 44.32, 44.35, 44.41, 47.1, 53.1, 53.28

(56) References Cited

U.S. PATENT DOCUMENTS 5,708,636 A * 1/1998 Takahashi et al. ........ 369/44.41
6,084,843 A * 7/2000 Abe et al. ................ 369/112.07
6,141,303 A 10/2000 Supino et al. ............ 369/44.28
6,385,158 B1 5/2002 Takagi et al. ............ 369/112.16
6,442,111 B1 * 8/2002 Takahashi et al. ........ 369/44.28

FOREIGN PATENT DOCUMENTS

EP 1 041 546 A1 10/2000
WO 98/24089 6/1998

* cited by examiner

Primary Examiner—Muhammad Edun
(74) Attorney, Agent, or Firm—Ladas & Parry

(57) ABSTRACT

A track-jump controlling apparatus that controls track-jump operations over disks complying with various DVD data formats includes a quad photodetector having quadrants B1 to B4, a DPDTE signal generator 13 for generating DPD tracking error signals, a push-pull signal generator 14 for generating push-pull signals, and a TZC signal generator 15 having a selector switch 15a for switching the path between the DPDTE signals and the push-pull signals and a comparator 15b for generating TZC signals. In order to prevent failure to obtain proper TZC signals in a seek operation with respect to a DVD-RW, etc. involving passage over an unrecorded area during reproduction, for example, the selector switch 15a is switched to the push-pull signal side to prevent track counting failure associated with the track-jump operation with respect to the DVD-RW.

10 Claims, 5 Drawing Sheets

TRACK-JUMP CONTROLLING APPARATUS AND METHOD

BACKGROUND OF THE INVENTION

1. Field of the Invention

The present invention relates generally to track-jump (seek) controlling apparatuses and methods that control track-jump operations with respect to a disk attached to a disk player, and particularly to a track-jump controlling apparatus and method which is applicable to a disk player capable of playing different types of disks and which are designed to control track-jump operations such that an optimum track-jump operation is selected for each type of disk.

2. Description of Related Art

Disk players that can play a disk such as a DVD, for example, change the reproducing position of the disk by a track-jump (seek) operation through which their pickup is moved to a remote, desired track. When the pickup is moved from a current reproducing position to a seek target position, the number of tracks crossed by the pickup, or track crossings, is counted to obtain the exact distance moved by the pickup. In the case of DVD-ROMs, for example, the DPD (Differential Phase Detection) method is used, which is based on diagonal sum signals obtained from light intensity patterns detected by a quad photodetector. In this method, a phase difference between the relevant diagonal sum signals is detected to obtain a phase difference signal, and zero crossing points in such phase difference signals are detected to count track crossings.

By the way, latest versions of disks complying with DVD formats include, in addition to the above-mentioned DVD-ROMs as read-only memory devices, DVD-Rs (DVD-Recordable or DVD Write Once) and DVD-RWs (DVD-Rewirtable) as recordable devices, and the latter devices are now gaining in popularity. Thus, it is desirable to manufacture a DVD disk player that can play all types of DVD disks independently of their data formats.

However, such a disk player may have difficulty performing accurate track-jumping (seeking) with respect to these different types of DVD disks in some cases. For example, in a DVD having unrecorded areas where no data is recorded, no pits are formed in such unrecorded areas. Since DPD tracking error signals based on the DPD method require the presence of pits to detect phase differences, the use of the DPD tracking error signals would cause trouble in counting track crossings for the DVD. Further, a DVD-RW has a format requiring that an embossed pit array be included in its control data zone, and the pits formed in the embossed pit array are not so deep that DPD tracking error signals cannot be detected at sufficient levels. That is, the problem is that a track-jump operation using DPD tracking error signals is not applicable commonly to both DVD-ROMs and DVD-RWs.

SUMMARY OF THE INVENTION

The present invention has been made in view of this problem, and an object thereof is, therefore, to provide a track-jump controlling apparatus and method that can perform highly reliable track-jumping while accurately counting track crossings at all times, in an optical system that can accommodate different types of disks.

The above object of the present invention can be achieved by a track-jump controlling apparatus of the present invention for controlling a track-jump operation by moving a pickup in a radial direction of a disk, which is one of different types of disks. The apparatus is provided with: a first generating device for generating a differential phase detection (DPD) tracking error signal based on photodetection signals from said pickup; a second generating device for generating a push-pull signal based on said photodetection signals from said pickup; a signal selecting device for selecting one of said DPD tracking error signal and said push-pull signal as a signal for use in said track-jump operation according to a state of said disk before said seek operation is performed; and a track-jump operation device for performing said track-jump operation from a current reproducing position to a seek target position over said disk, while counting track crossings using said signal selected by said signal selecting device.

According to the present invention, the DPD tracking error signal and the push-pull signal are generated based on the photodetection signals from the pickup during a track-jump operation with respect to a disk, and one of the two signals is selected according to the state of the disk, whereby the selected signal is used to count track crossings to perform the track-jump operation from the current reproducing position to the seek target position. That is, the signal used for track-jumping (seeking) is optimized for each type of disk, whereby the number of tracks can be counted accurately at all times, and hence a highly reliable seek operation can be realized. In addition, even when a seek operation is performed in an optical system that can accommodate different types of disks, reliability in seeking can be improved while keeping accurate counting of track crossings.

In one aspect of the present invention, said disk is one that can only read data recorded in advance or one that can both record data and read recorded data, said signal selecting device determines whether an area where a degree of modulation of said photodetection signals is small is present, and selects said push-pull signal when it is determined that said area where a degree of modulation of said photodetection signals is small is present between said current reproducing position and said seek target position.

According to this aspect of the present invention, if a track-jump operation over said area where a degree of modulation of said photodetection signals is small is performed, Said push-pull signal is selected. Therefore, even if the DPD tracking error signal is unavailable because of the track-jump operation over said area such as an area where no pit is formed on a recording track, accurate counting of track crossings is executed.

In another aspect of the present invention, the apparatus is further provided with a wobble signal detecting device for detecting a wobble signal from said photodetection signals, said wobble signal based on wobbled recorded tracks of said disk. In addition, said signal selecting device selects said push-pull signal when said wobble signal has been detected by said wobble signal detecting device.

According to this aspect of the present invention, a wobble signal extractable from wobbled recorded tracks of a rewritable disk is utilized. When the wobble signal is detected from a predetermined area of the disk during seeking, push-pull signals are used. Hence, even when DPD tracking error signals obtained from the predetermined area of the disk having wobbled recorded tracks are not at proper levels, track crossings can be counted accurately by using the push-pull signals.

In further aspect of the present invention, said disk is a DVD-ROM that can only read data recorded in advance or a DVD-RW that can write data repetitively. Said DVD-RW includes a control data zone having an embossed pit array formed therein, said embossed pit array corresponding to predetermined control data. Further, said track-jump controlling device controls said track-jump operation such that said pickup passes over said control data zone.

According to this aspect of the present invention, when a track jump operation involving passage over a control data zone is to be performed in a DVD-RW, and if a wobble signal is detected from a predetermined area, then the push-pull signal is selected. Hence, when the DVD-RW is activated to have the pickup passed over an embossed pit array formed in its control data zone, an improper seek operation due to a pit having a small depth can be avoided.

The above object of the present invention can be achieved by a track-jump controlling method of the present invention for controlling a track-jump operation by moving a pickup in a radial direction of a disk, which is one of different types of disks. The method is provided with the processes of: a first generating process of generating a DPD tracking error signal based on photodetection signals from said pickup;

a second generating process of generating a push-pull signal based on said photodetection signals from said pickup; a selecting process of selecting one of said DPD tracking error signal and said push-pull signal as a signal for use in said seek operation, according to a state of said disk before said track-jump operation is performed; and a controlling process of controlling said track-jump operation such that said pickup moves from a current reproducing position to a seek target position over said disk, while counting track crossings using said selected signal.

According to the present invention, the DPD tracking error signal and the push-pull signal are generated based on the photodetection signals from the pickup during a track-jump operation with respect to a disk, and one of the two signals is selected according to the state of the disk, whereby the selected signal is used to count track crossings to perform the track-jump operation from the current reproducing position to the seek target position. That is, the signal used for track-jumping (seeking) is optimized for each type of disk, whereby the number of tracks can be counted accurately at all times, and hence a highly reliable seek operation can be realized. In addition, even when a seek operation is performed in an optical system that can accommodate different types of disks, reliability in seeking can be improved while keeping accurate counting of track crossings.

In one aspect of the present invention, said disk is one that can only read data recorded in advance or one that can both record data and read recorded data, the method is further provided with a determining process of determining whether an area where a degree of modulation of said photodetection signals is small is present, and said controlling process controls said track-jump operation by selecting said push-pull signal when it is determined that said area where a degree of modulation of said photodetection signals is small is present between said current reproducing position and said seek target position.

According to this aspect of the present invention, if a track-jump operation over said area where a degree of modulation of said photodetection signals is small is performed, Said push-pull signal is selected. Therefore, even if the DPD tracking error signal is unavailable because of the track-jump operation over said area such as an area where no pit is formed on a recording track, accurate counting of track crossings is executed.

In another aspect of the present invention, the method is further provided with a detecting process of detecting, from said photodetection signals, a wobble signal based on wobbled recorded tracks of said disk, wherein said controlling process controls said track-jump operation by selecting said push-pull signal when said wobble signal has been detected.

According to this aspect of the present invention, a wobble signal extractable from wobbled recorded tracks of a rewritable disk is utilized. When the wobble signal is detected from a predetermined area of the disk during seeking, push-pull signals are used. Hence, even when DPD tracking error signals obtained from the predetermined area of the disk having wobbled recorded tracks are not at proper levels, track crossings can be counted accurately by using the push-pull signals.

DETAILED DESCRIPTION OF THE PREFERRED EMBODIMENT

Figure 1:
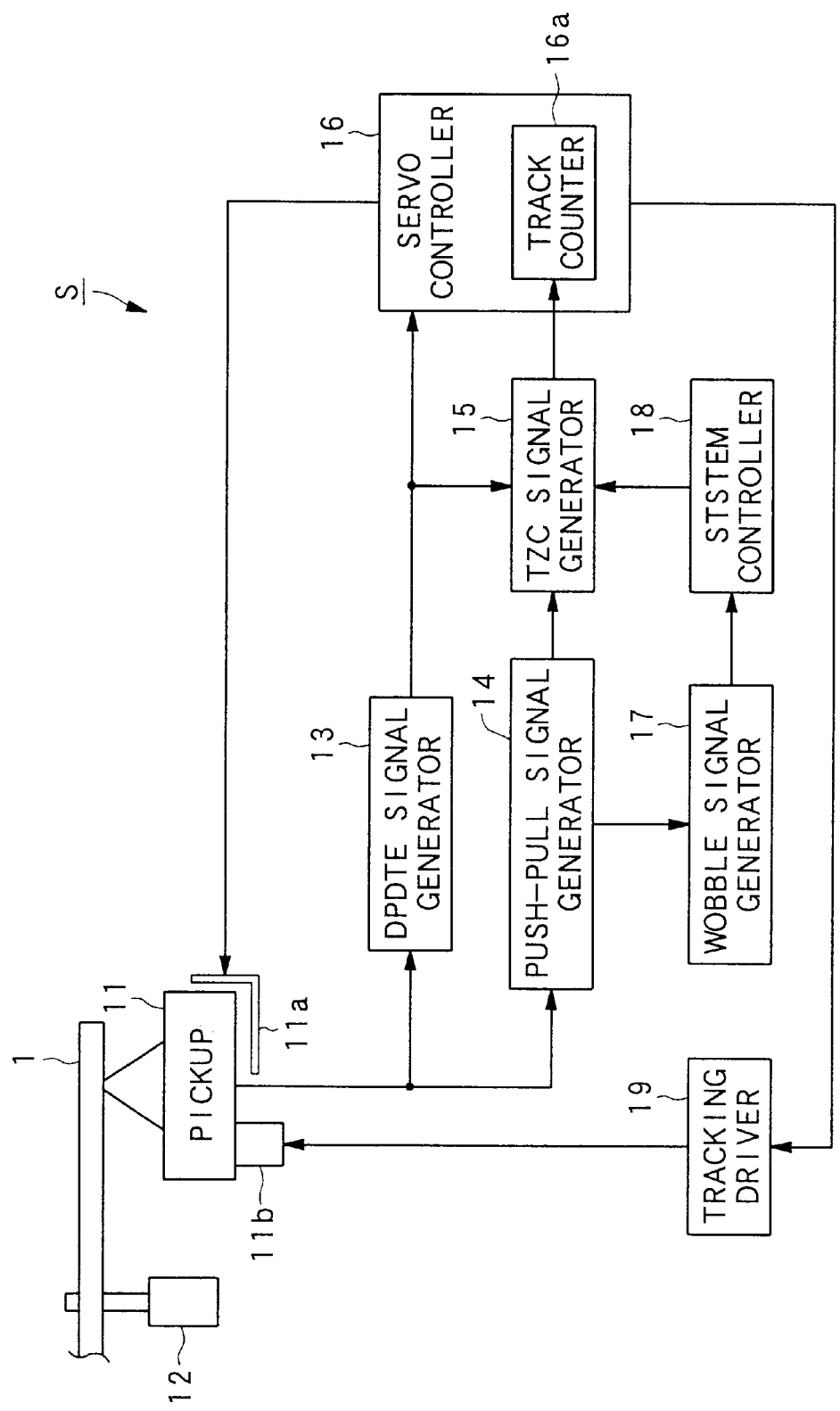
FIG. 1 is a block diagram showing the general configuration of a disk player according to an embodiment of the invention.

The present invention will now be described with reference to a preferred embodiment shown in the drawings. The following description refers to the case where the invention is applied to a disk player that can play disks complying with DVD data formats.

FIG. 1 is a block diagram showing the general configuration of a disk player S according to this embodiment. The disk player S shown in FIG. 1 is comprised of a pickup 11, a spindle motor 12, a DPDTE signal generator 13, a push-pull signal generator 14, a TZC signal generator 15, a servo controller 16, a wobble signal generator 17, a system controller 18, and a tracking driver 19. The disk player S reproduces data recorded in a disk 1 attached thereto.

In FIG. 1, the disk player S according to this embodiment can play both a read-only DVD-ROM and a recordable DVD-RW or DVD-R (hereinafter referred to as "DVD-RW, etc.") as the disk 1. When attached to the disk player S, the disk 1 starts rotating while driven by the spindle motor 12, and is radiated with a light beam from the pickup 11 during rotation, whereby the recorded data on the disk 1 is reproduced.

The pickup 11 radiates a laser beam onto an information recorded surface of the disk 1 through an optical system, and then causes a photodetector, to be described hereinafter, to output photodetection signals based on the reflected laser beam therefrom. The photodetection signals from the pickup 11 are subjected to processes including decoding and error correction by a signal processing circuit, not shown, for subsequent reproduction of the recorded data. The photodetection signals from the pickup are also supplied to both the DPDTE signal generator 13 and the push-pull signal generator 14.

The DPDTE signal generator 13 generates DPD tracking error (TE) signals, which are tracking error signals based on the DPD method known as a tracking servo system. The DPDTE signals generated by the generator 13 are used for tracking servo control during reproduction, and selected as signals for use in seeking as well. Thus, the DPDTE signal generator 13 functions as first generating device of the invention, whose configuration and operation will be detailed hereinafter.

Further, the push-pull signal generator 14 generates push-pull signals based on the push-pull method. In this embodiment, the push-pull signals generated by the generator 14 are used for generating wobble signals and are selected as signals used for an optimum track-jump operation according to the state of the disk 1. Thus, the push-pull signal generator 14 functions as second generating device of the invention, whose configuration and operation will be detailed hereinafter.

The TZC signal generator 15 generates TZC (Track Zero Crossing) signals used for measuring the distance moved by the pickup 11 during track-jumping (seeking). A TZC signal is generated by converting a DPDTE signal or a push-pull signal into a binary signal. It should be noted that the generator 15 includes a selector switch 15a (see FIG. 2) through which the system controller 18 selectively switches the path between the DPDTE signal and the push-pull signal, as will be described hereinafter.

The servo controller 16 generates various control signals necessary for tracking servo control and focusing servo control for the pickup 11, and driving control for a slider 11a. As shown in FIG. 1, the servo controller 16 applies control signals to the slider 11a that moves the entire pickup 11 along the radius of the disk 1 to a distance, and applies tracking control signals to the tracking driver 19. The driver 19 applies drive signals to a tracking actuator 11b that moves the pickup 11 along the radius of the disk 1 within a small range.

The servo controller 16 also includes a track counter 16a for counting track crossings based on TZC signals during track-jumping (seeking). The counter 16a detects the edges of pulses contained in the TZC signals to count track crossings during track-jumping (seeking), and the track crossing count is used to determine the position of the pickup 11. The counter 16a is a component that causes track-jump operation device of the invention to function.

The wobble signal generator 17 extracts, from the disk 1 having wobbled groove tracks, a wobble signal having a signal pattern matching with the amplitude of the wobbled groove tracks, and outputs the extracted wobble signal to the system controller 18 for use as a reproduction timing reference. The generator 17 is provided with a bandpass filter that separates a signal component having a predetermined range of wobble frequencies from the push-pull signal, for passage there through with unwanted components further removed.

The system controller 18 supervises control over the whole operation of the disk player S. The controller 18 is connected to the components of various parts of the disk player S to control these components through communication of data and control signals therewith. The controller 18 includes storage device such as a ROM and a RAM, not shown, for reading processing programs stored in the ROM while temporarily storing data in the RAM.

Figure 2:
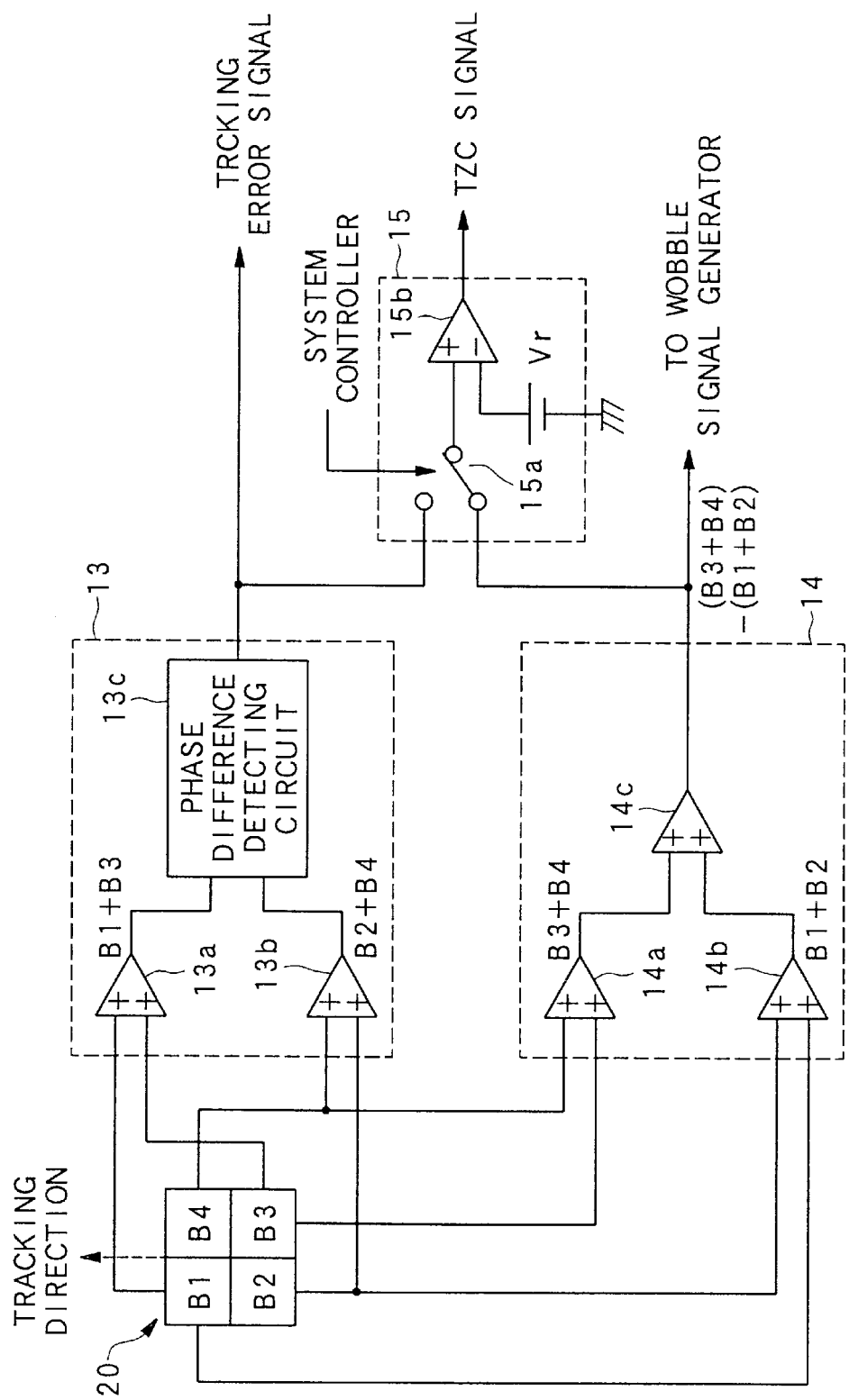
FIG. 2 is a block diagram showing the configuration of the main part relevant to track-jump operations of the disk player according to the embodiment.

FIG. 2 is now referred to, which is a block diagram showing the main part of the disk player S of FIG. 1, which is relevant to track-jump operations of the invention. In the configuration of FIG. 2, shown are the DPDTE signal generator 13, the push-pull signal generator 14, the TZC signal generator 15, and a photodetector 20 included in the pickup 11.

In FIG. 2, the photodetector 20, which is divided into four quadrants B1 to B4 through dividing lines extending in both the radial and tracking directions of the disk 1, outputs a photodetection signal corresponding to each of these quadrants B1 to B4.

To obtain diagonal sum signals for light intensity patterns detected by the photodetector 20, in the DPDTE signal generator 13, an adder 13a generates an addition signal B1+B3 and an adder 13b generates an addition signal B2+B4. Then a phase difference detecting circuit 13c detects a phase difference between the two addition signals to generate a DPDTE signal. That is, when a light beam passes over a pit, the light beam is diffracted so that changes of light intensity patterns formed by the reflected light beam are opposite to each other in phase among relevant pairs of diagonal sum signals corresponding to such light intensity patterns. Thus, by using their detected phase differences, the positional relationship between the pit and the light beam can be determined.

On the other hand, to obtain a symmetrical light intensity pattern in the tracking direction of the photodetector 20, in the push-pull signal generator 14, an adder 14a generates an addition signal B3+B4 and an adder 14b generates an addition signal B1+B2. Then a subtractor 14c generates a signal indicative of the difference (B3+B4)−(B1+B2). That is, when the light beam is radiated off the centerline of a track, light intensity patterns formed by the light beam reflected from the pit or the groove track vary according to the depth of the pit or the groove track. By utilizing this phenomenon, the position of the light beam can be determined.

The TZC signal generator 15 is comprised of the selector switch 15a and a comparator 15b. A DPDTE signal from the DPDTE signal generator 13 and a push-pull signal from the push-pull signal generator 14 are applied to the inputs of the switch 15a, respectively. Then, the system controller 18 controls the switch 15a to connect one of the inputs of the switch 15a to the plus side of the comparator 15b according to the state of the disk 1. Thus, the selector switch 15a functions as signal selecting device of the invention, together with the system controller 18.

The comparator 15b has a predetermined reference voltage Vr applied to the minus side thereof, and outputs a TZC signal whose polarity is inverted depending on which one of the input signal and the reference voltage Vr is greater. By properly setting the value of the reference voltage Vr, pulses are generated every time the light beam from the pickup 11 radiated onto the disk 1 crosses a groove track or a pit during a seek operation, thereby to count track crossings.

During the track-jump operation, both DPDTE and push-pull signals are sinusoidal signals linked with a track detection cycle. Further, a TZC signal is a bipolar, pulsed signal matching with the positive or negative polarity of either a DPDTE or push-pull signal.

Figure 3:
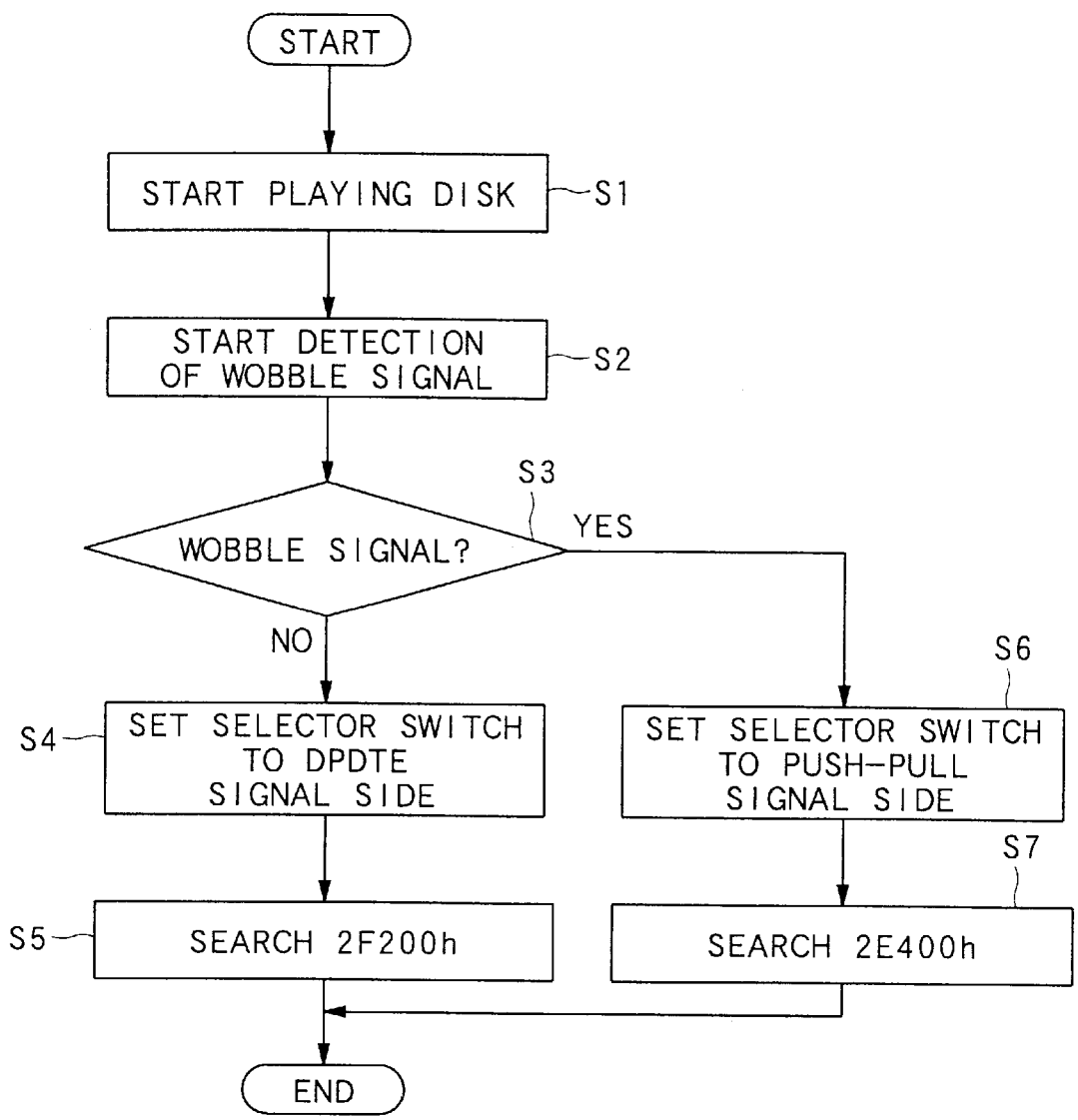
FIG. 3 is a flowchart showing a routine executed upon starting up of a disk attached to the disk player according to the embodiment.

Next, the routine executed for the disk player S according to this embodiment will be described with reference to FIGS. 3 to 5. Two different routines are available for the disk player S according to this embodiment. These two routines are different in terms of the timing at which the selector switch 15a of the TZC signal generator 15 is set according to the type of the disk 1. The routine shown in FIG. 3 is applied to the case where the selector switch 15a is set when the disk player S starts playing the disk 1, whereas the routine shown in FIG. 5 is applied to the case where the switch 15a is set during reproduction of the disk 1 data.

The routine shown in FIG. 3 will be described first. In FIG. 3, a start-up operation for the disk 1 attached to the disk player S is started (step S1), to cause the slider 11a to bring the pickup 11 to the starting position of a data area of the disk 1, and in parallel, to drive the spindle motor 12 for rotation. It should be noted that the data area of the disk 1 starts at a sector number 30000h for any types of DVDs (see FIG. 4).

Then, the pickup 11 radiates a light beam onto the surface of the disk 1 to produce photodetection signals, and the wobble signal generator 17, respective thereto, starts detecting a wobble signal (step S2). Then, it is determined whether the wobble signal is present or not during the start-up of the disk 1 (step S3). This step is performed to identify the disk 1 type, whether it is a DVD-RW, etc. whose groove tracks are wobbled, or a DVD-ROM whose groove tracks are not wobbled.

When the answer at step S3 is "NO," the selector switch 15a of the TZC signal generator 15 is set to the DPDTE signal side (step S4). Successively, to refer to control data necessary for controlling reproduction of the disk 1 data, a sector number 2F200h is searched (step S5). That is, since it is surmised that the disk 1 would be a DVD-ROM from the result that the wobble signal is not detected at step S3, the sector number 2F200h at which the control data zone starts is searched according to a procedure for playing the DVD-ROM. During a track-jump operation associated with the search at step S5, the track counter 16a counts track crossings based on the DPDTE signals.

On the other hand, if the answer is "YES" at step S3, the selector switch 15a of the TZC signal generator 15 is set to the push-pull side (step S6). Successively, to check the disk type, a sector number 2E400h is searched (step S7). That is, since it is surmised that the disk 1 would be a DVD-RW or DVD-R from the result that the wobble signal is detected at step S3, the sector number 2E400h is searched, at which the physical format information zone having the book type of the DVD-RW or DVD-R recorded therein begins.

Here, the reason why the number of tracks is counted based on the push-pull signals during the search at step S7 will be described with reference to FIG. 4, in which the format of a DVD-ROM on the left side is compared with the format of a DVD-RW on the right side. According to the format of the DVD-RW, there are arranged, from the radially inner side of the disk, an initial zone, a system reserved area, a buffer zone, a physical format information zone, a reference code zone, a buffer zone, a control data zone, a buffer zone, and a data area.

Figure 4:
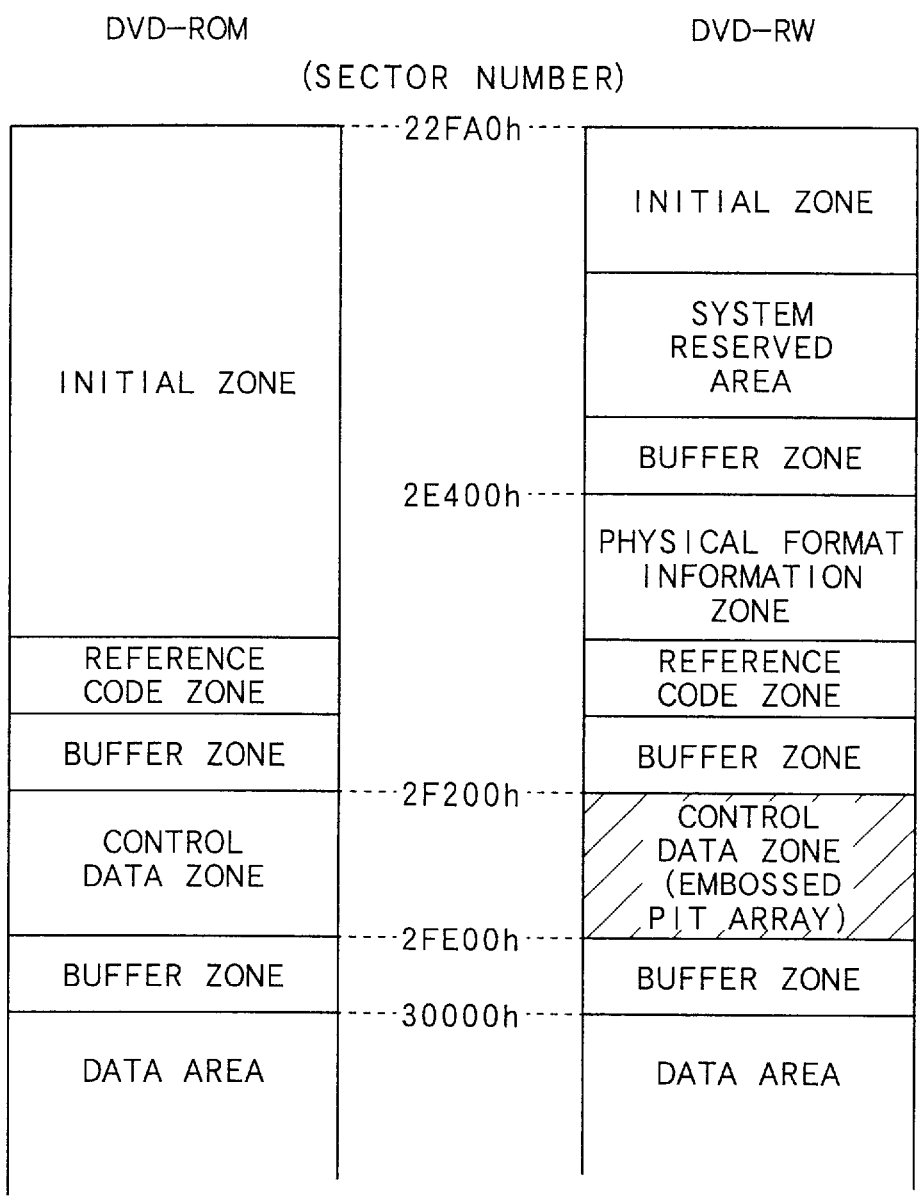
FIG. 4 is a diagram illustrating why push-pull signals are used to count track crossings during execution of a search at step S7 of FIG. 3.
Figure 5:
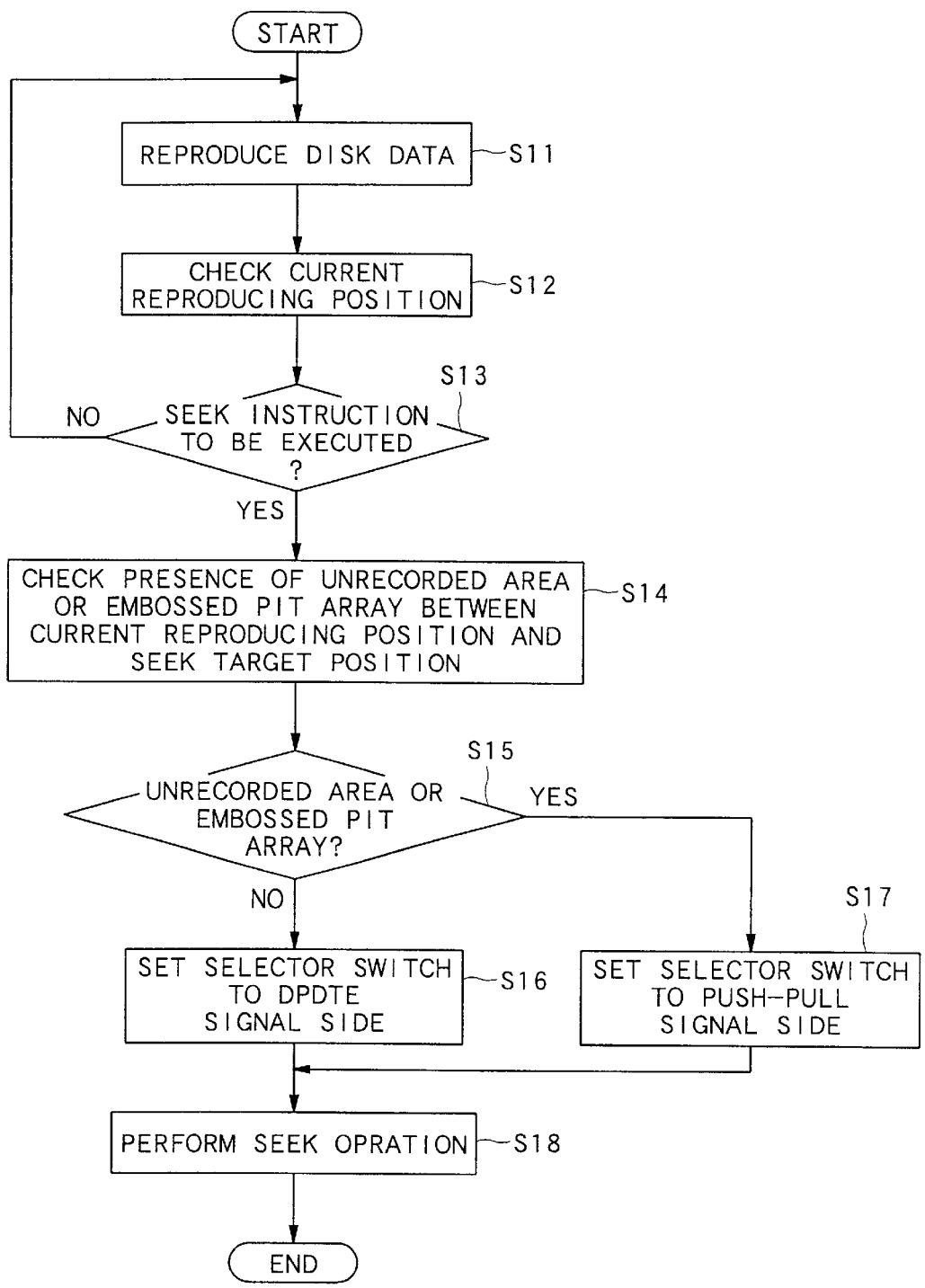
FIG. 5 is a flowchart showing a routine executed during reproduction of data on the disk attached to the disk player according to the embodiment.

As shown in FIG. 4, the DVD-RW and the DVD-ROM share in common a sector number 22FA0h at which their initial zone starts, the sector number 2F200h at which their control data zone starts, and a sector number 30000h at which their data area starts. Provided that, an embossed pit array for recording predetermined control data is formed in whole or part of the control data zone of the DVD-RW. Since each pit in the embossed pit array is not deep enough to allow the diffracted light beam to form conspicuously changing light intensity patterns. That is, the degree of modulation of the light reflected from the disk 1 is small. Thus, when the light beam passes over the control data zone during a track-jump operation with respect to the DVD-RW, the levels of DPDTE signals obtained therefrom are so week that some of the DPDTE signals obtained during the track-jump operation fail to contribute to accurate counting of track crossings. However, this failure resulting from the use of the DPDTE signals can be compensated for if push-pull signals are used. Since wobbled groove tracks are formed in the control data zone of the DVD-RW, and since the push-pull signals are effective in counting track crossings over wobbled groove tracks, the use of push-pull signals works in counting track crossings over the DVD-RW.

In the routine of FIG. 3, the start-up operation for the disk 1 is started by searching the data area at step S1, after which the starting position of the physical format information zone is searched at step S7. That is, a track-jump operation must be performed, in which the pickup 11 returns to the sector number 2E400h from the data area while crossing over the control data zone at 2F200h and later sector numbers. Thus, this is why the selector switch 15a must be set to the push-pull signal side at step S6, in order to prevent inaccuracy associated with the use of the DPDTE signals for counting track crossings when the pickup 11 passes over the control data zone, as mentioned above.

Next, the routine shown in FIG. 5 will be described. In FIG. 5, an operation of reproducing the disk 1 attached to the disk player S starts (step S11) to have the disk 1 servo-controlled by the servo controller 16 and driven by the spindle motor 12 for rotation. During the reproduction of the disk 1 data, an address of the disk 1 is read to check the current reproducing position (step S12).

Then, whether or not a track-jump instruction is to be executed during the reproduction of the disk 1 data is determined (step S13). For example, to reproduce data recorded on the disk 1 at a predetermined position remote from the current reproducing position, a track-jump operation based on the track-jump instruction is executed. When the answer at step S13 is "NO," the routine returns to step S11 to repeat the steps in the loop.

If, on the other hand, the answer at step S13 is "YES," then the routine checks if unrecorded areas, etc. is interposed between the current reproducing position and the target position corresponding to the track-jump instruction (step S14). That is, this checking step S14 is required in order to determine which one of the DPDTE signal and the push-pull signal is to be used for generation of TZC signals, according to the recorded state of tracks which will be passed over during the seek operation.

Specifically, areas to be checked at step S14 include partially unrecorded areas or embossed pit arrays. For example, when data is recorded to or deleted from a predetermined recorded area of a disk from which recorded information is partially erasable, the edited information is saved in a predetermined area on the disk, and hence, by referring to such edited information, the position of the unrecorded area on the disk can be specified. The presence of any unrecorded area between the current reproducing position and the seek target position can be determined by comparing relevant addresses.

Further, in the case of a DVD-RW, the control data zone with an embossed pit array exists between the sector numbers 2F200h and 2FE00h, as shown in FIG. 4, and hence the determination at step S14 can be made by checking whether or not the control data zone is interposed between the current reproducing position and the seek target position.

Then, it is determined whether or not an unrecorded area or an embossed pit array exists between the current reproducing position and the seek target position based on the relevant addresses, etc. checked at step S14 (step S15), and if the answer at step S15 is "NO," the selector switch 15a is set to the DPDTE signal side (step S16). If, on the other hand, the answer at the step S15 is "YES," the switch 15a is set to the push-pull signal side (step S17). As a result, even when the pickup performs a track-jump operation over an area where the degree of modulation of the reflected light beam is not sufficient, such as an unrecorded area with no pits, or an embossed pit array where the diffraction of the light beam does not produce conspicuously changing light intensity patterns, the push-pull signals which can count track crossings based on groove tracks are used, in place of the DPDTE signals, and hence a proper track-jump operation can be performed.

Then, the track-jump operation is actually executed toward the target position on the disk 1 (step S18). During this operation, in the TZC signal generator 15, the track counter 16a counts track crossings using TZC signals generated by DPDTE signals or push-pull signals selected according to the above-mentioned switch setting. The routine of FIG. 5 is terminated when the track counter 16a counts a predetermined value to bring the track-jump operation continuously performed at step S18 to an end.

While the case where the disk player S that can play both DVD-ROMs and DVD-RWs, etc. is used has been described in the above embodiment, the invention can be applied to other disk players as long as such disk players can play different types of disks and control seek operations while switching signals according the state of the disk attached thereto, as mentioned above.

Further, in the above embodiment, the presence/absence of an embossed pit array is predicted by the presence/absence of a wobble signal to control the selector switch 15a. However, any other techniques may be employed as long as the presence/absence of an emboss pit array can be determined.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-254159 filed on Aug. 24, 2000 including the specification, claims, drawings and summary is incorporated herein by reference in its entirety.

What is claimed is:

1. A track-jump controlling apparatus for controlling a track-jump operation by moving a pickup in a radial direction of a disk, which is one of different types of disks, the apparatus comprising:
   a first generating device for generating a differential phase detection (DPD) tracking error signal based on photodetection signals from said pickup;
   a second generating device for generating a push-pull signal based on said photodetection signals from said pickup;
   a signal selecting device for selecting one of said DPD tracking error signal and said push-pull signal based on information recorded on the disk in advance as a signal for use in said track-jump operation according to a state of said disk before a seek operation is performed;
   a track-jump operation device for performing said track-jump operation from a current reproducing position to a seek target position over said disk, while counting track crossings using said signal selected by said signal selecting device.

2. The apparatus according to claim 1, wherein said disk is one that can only read data recorded in advance or one that can both record data and read recorded data,
   said signal selecting device determines whether an area where a degree of modulation of said photodetection signals is small is present, and selects said push-pull signal when it is determined that said area where a degree of modulation of said photodetection signals is small is present between said current reproducing position and said seek target position.

3. The apparatus according to claim 1, further comprising:
   a wobble signal detecting device for detecting a wobble signal from said photodetection signals, said wobble signal based on wobbled recorded tracks of said disk;
   wherein said signal selecting device selects said push-pull signal when said wobble signal has been detected by said wobble signal detecting device.

4. The apparatus according to claim 3, wherein said disk is a DVD-ROM that can only read data recorded in advance or a DVD-RW that can write data repetitively,
   said DVD-RW includes a control data zone having an embossed pit array formed therein, said embossed pit array corresponding to predetermined control data, and
   said track-jump controlling device controls said track-jump operation such that said pickup passes over said control data zone.

5. The apparatus according to claim 1, wherein said signal selecting device selects one of said DPD tracking error signal and said push-pull signal by judging at least one of said photodetection signal forming the recorded information, whether or not an unrecorded area on the disk exists, and whether or not an embossed pit array exists based on the recorded information on the disk in advance.

6. The apparatus according to claim 1, wherein said signal selecting device selects one of said DPD tracking error signal and said push-pull signal by judging whether or not the recorded information is formed of wobble signal based on the recorded information on the disk in advance.

7. A track-jump controlling method of controlling a track-jump operation by moving a pickup in a radial direction of a disk, which is one of different types of disks, the method comprising the processes of:
   a first generating process of generating a DPD tracking error signal based on photodetection signals from said pickup;
   a second generating process of generating a push-pull signal based on said photodetection signals from said pickup;
   a selecting process of selecting one of said DPD tracking error signal and said push-pull signal based on information recorded on the disk in advance as a signal for use in a seek operation, according to a state of said disk before said track-jump operation is performed; and
   a controlling process of controlling said track-jump operation such that said pickup moves from a current reproducing position to a seek target position over said disk, while counting track crossings using said selected signal.

8. The method according to claim 7, wherein said disk is one that can only read data recorded in advance or one that can both record data and read recorded data, the method further comprises a determining process of determining whether an area where a degree of modulation of said photodetection signals is small is present, and said controlling process controls said track-jump operation by selecting said push-pull signal when it is determined that said area where a degree of modulation of said photodetection signals is small is present between said current reproducing position and said seek target position.

9. The method according to claim 7, further comprising a detecting process of detecting, from said photodetection signals, a wobble signal based on wobbled recorded tracks of said disk, wherein said controlling process controls said track-jump operation by selecting said push-pull signal when said wobble signal has been detected.

10. The method according to claim 7, wherein said signal selecting process selects one of said DPD tracking error signal and said push-pull signal by judging at least one of whether or not the recorded information is formed of said photodetection signals, whether or not an unrecorded area on the disk exists, and whether or not an embossed pit array exists based on the recorded information on the disk in advance.

* * * * *